(12) United States Patent
Gogolin

(10) Patent No.: US 10,325,424 B2
(45) Date of Patent: Jun. 18, 2019

(54) MACHINE TIME USAGE DETERMINATION SYSTEM AND METHOD

(71) Applicant: Caterpillar Inc., Peoria, IL (US)

(72) Inventor: Richard William Gogolin, Norman Park (AU)

(73) Assignee: Caterpillar Inc., Deerfield, IL (US)

( * ) Notice: Subject to any disclaimer, the term of this patent is extended or adjusted under 35 U.S.C. 154(b) by 85 days.

(21) Appl. No.: 15/480,770

(22) Filed: Apr. 6, 2017

(65) Prior Publication Data

US 2018/0293808 A1    Oct. 11, 2018

(51) Int. Cl.
*G07C 5/00* (2006.01)
*E02F 9/26* (2006.01)
*G07C 5/08* (2006.01)
*E02F 9/20* (2006.01)

(52) U.S. Cl.
CPC .......... *G07C 5/0841* (2013.01); *E02F 9/2054* (2013.01); *E02F 9/267* (2013.01); *B60Y 2200/41* (2013.01)

(58) Field of Classification Search
CPC .......... G07C 5/008; G07C 5/0841; E02F 9/26
See application file for complete search history.

(56) References Cited

U.S. PATENT DOCUMENTS 8,190,335 B2    5/2012   Vik

*Primary Examiner* — Basil T. Jos
(74) *Attorney, Agent, or Firm* — Miller, Matthias & Hull

(57) ABSTRACT

A machine time usage determination system includes a data processing pipeline configured to receive data from a plurality of sources, a machine time usage determination program, and a controller in communication with the data processing pipeline and configured to execute the machine time usage determination program. Thus, the controller is configured to review a set of data from the data processing pipeline, and assign a current activity of a set of predetermined machine activities to a piece of equipment based on the set of data. Each activity of the set of predetermined machine activities is categorized as a productive activity or an unproductive activity. The controller is also configured to determine a probability value associated with the assigned current activity.

20 Claims, 3 Drawing Sheets

MACHINE TIME USAGE DETERMINATION SYSTEM AND METHOD

TECHNICAL FIELD

The present disclosure relates generally to machine time usage and, more particularly, to a system and method for evaluating data from multiple sources to automatically assign time usages to machines or equipment.

BACKGROUND

Mining, construction, and other large scale excavating operations require fleets of digging, loading, and hauling machines to remove and transport excavated material such as ore or overburden from an area of excavation to a predetermined destination. For such an operation to be profitable, the fleet of machines must be productively and efficiently operated. Many factors can influence productivity and efficiency at a worksite including, among other things, machine conditions (i.e., age, state of disrepair, malfunction, fuel grade in use, etc.), operator conditions (i.e., experience, skill, dexterity, ability to multi-task, machine or worksite familiarity, etc.), and site conditions (i.e., rain, snow, ground moisture levels, material composition, visibility, terrain contour, etc.). Unfortunately, when operations at a worksite are unproductive or inefficient, it can be difficult to determine which of these factors is having the greatest influence and should be addressed.

U.S. Pat. No. 8,190,335 to Vik et al. discloses a performance management system for a plurality of machines at a worksite. The performance management system includes a data acquisition module configured to monitor performance of the machines, and a controller configured to collect machine performance data from the data acquisition module to detect a performance irregularity. The controller may also be configured to determine which of a machine condition, operator condition, or site condition is the predominant cause of the performance irregularity.

As should be appreciated, there is a continuing need for strategies to improve performance and efficiency of construction and mining operations.

SUMMARY OF THE INVENTION

In one aspect, a machine time usage determination system includes a data processing pipeline configured to receive data from a plurality of sources, a machine time usage determination program, and a controller in communication with the data processing pipeline and configured to execute the machine time usage determination program. Thus, the controller is configured to review a set of data from the data processing pipeline, and assign a current activity of a set of predetermined machine activities to a piece of equipment based on the set of data. Each activity of the set of predetermined machine activities is categorized as a productive activity or an unproductive activity. The controller is also configured to determine a probability value associated with the assigned current activity.

In another aspect, a method of determining time usage using a machine time usage determination program is provided. The method includes steps of receiving data from a plurality of sources via a data processing pipeline, reviewing a set of data from the data processing pipeline, and assigning a current activity of a set of predetermined machine activities to a piece of equipment based on the set of data. Each activity of the set of predetermined machine activities is categorized as a productive activity or an unproductive activity. The method also includes a step of determining a probability value associated with the assigned current activity.

DETAILED DESCRIPTION

Figure 1:
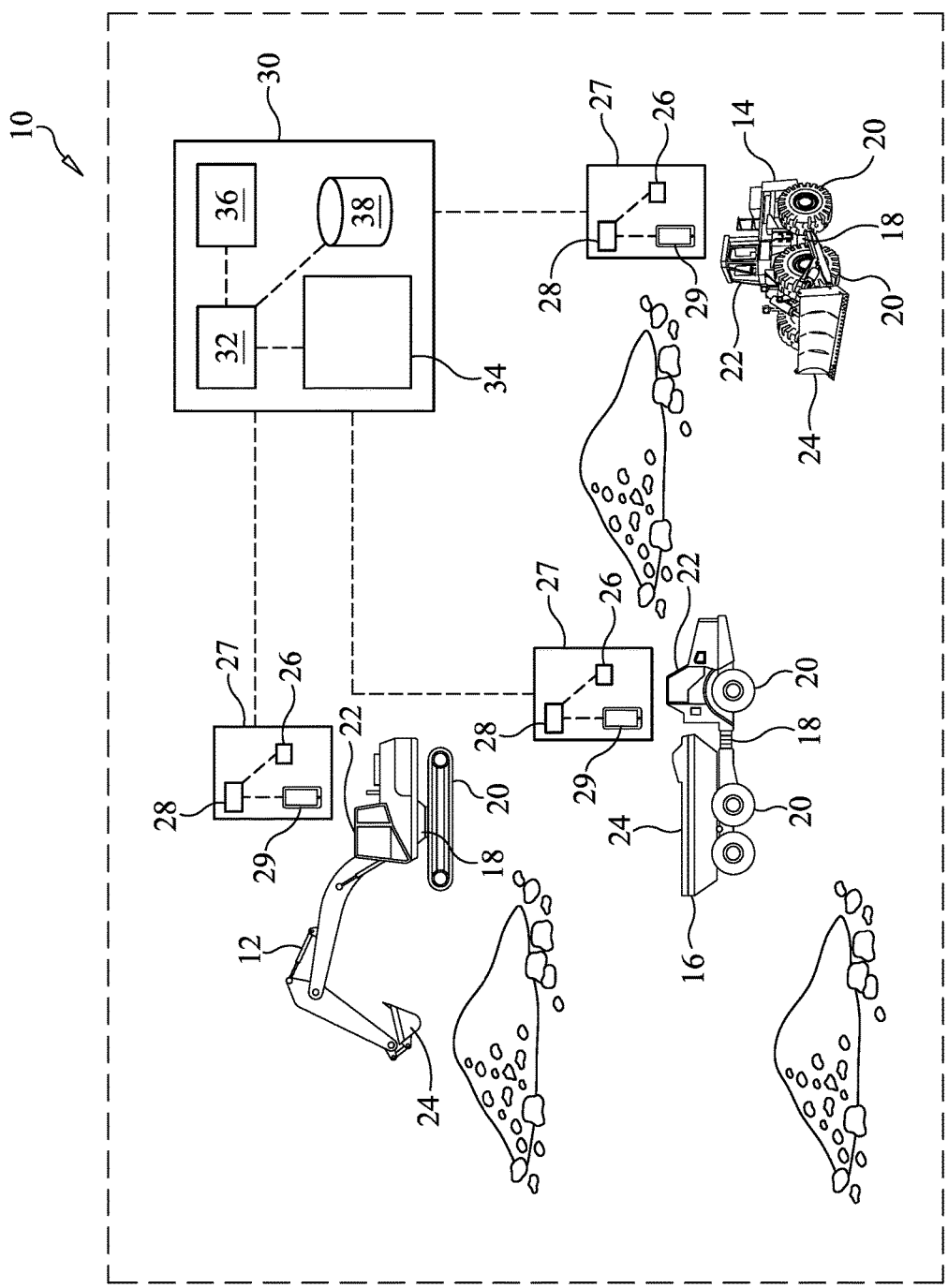
FIG. 1 is a schematic diagram of exemplary machines at a common worksite, according to an embodiment of the present disclosure.

FIG. 1 shows a worksite 10 such as, for example, a mine site, at which minerals or other materials are extracted from the earth. As part of the mining process, various pieces of equipment, or machines, may operate at or between different locations of the worksite 10 to perform various functions, such as, for example, removing overburden, breaking and removing rocks, and processing materials being extracted. These machines may include, among various other pieces of equipment, digging machines 12 (only one of which is shown), loading machines 14 (only one of which is shown), and hauling machines 16 (only one of which is shown), with each group of similar machines performing similar functions, which may include a repeated pattern of tasks, or work cycles.

Each of the machines 12, 14, 16 may generally include a frame 18, supporting ground engaging elements 20, an operator control station 22, and an implement 24, such as a bucket, dump body, or other work implement. The machines 12, 14, 16 may also include one or more sensors 26, comprising part of an onboard electronics system 27, positioned and configured to detect or measure one or more physical properties related to operation and/or performance of the machines 12, 14, 16. The onboard electronics system 27 may also include at least one controller 28, configured to communicate with the sensor(s) 26 and/or various other systems or devices via wired and/or wireless communication lines to monitor and control various aspects of the respective machine 12, 14, 16. The controller 28 may also communicate with an operator interface 29, which may be used, among other functions, to monitor or control operations of the respective machine 12, 14, 16.

Each controller 28 may include hardware and software for receiving, sending, processing, analyzing and/or storing data, such as in the form of signals, regarding all or portions of the functions performed by the respective machine 12, 14, 16. Each of the controllers 28 may be of standard design and may include a processor, such as, for example, a central processing unit, a memory, and an input/output circuit that facilitates communication internal and external to the respective controller 28. The memory may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices.

Each of the machines 12, 14, 16, and/or the controllers 28 thereof, may be in communication with each other and/or with a central control station 30 by way of wireless communication to transmit and receive data, such as, for example, machine data, site data, operator data, performance data, diagnostic data, and various other data. The central control station 30 may manage and/or monitor the mining process, or other process, performed at the worksite 10, and the equipment, such as machines 12, 14, 16, used in the process. According to some embodiments, data gathered by the central control station 30 may be sent off-board or off-site, such as via wireless communications, for monitoring performance and/or performing calculations or analysis relative to the worksite 10.

Figure 2:
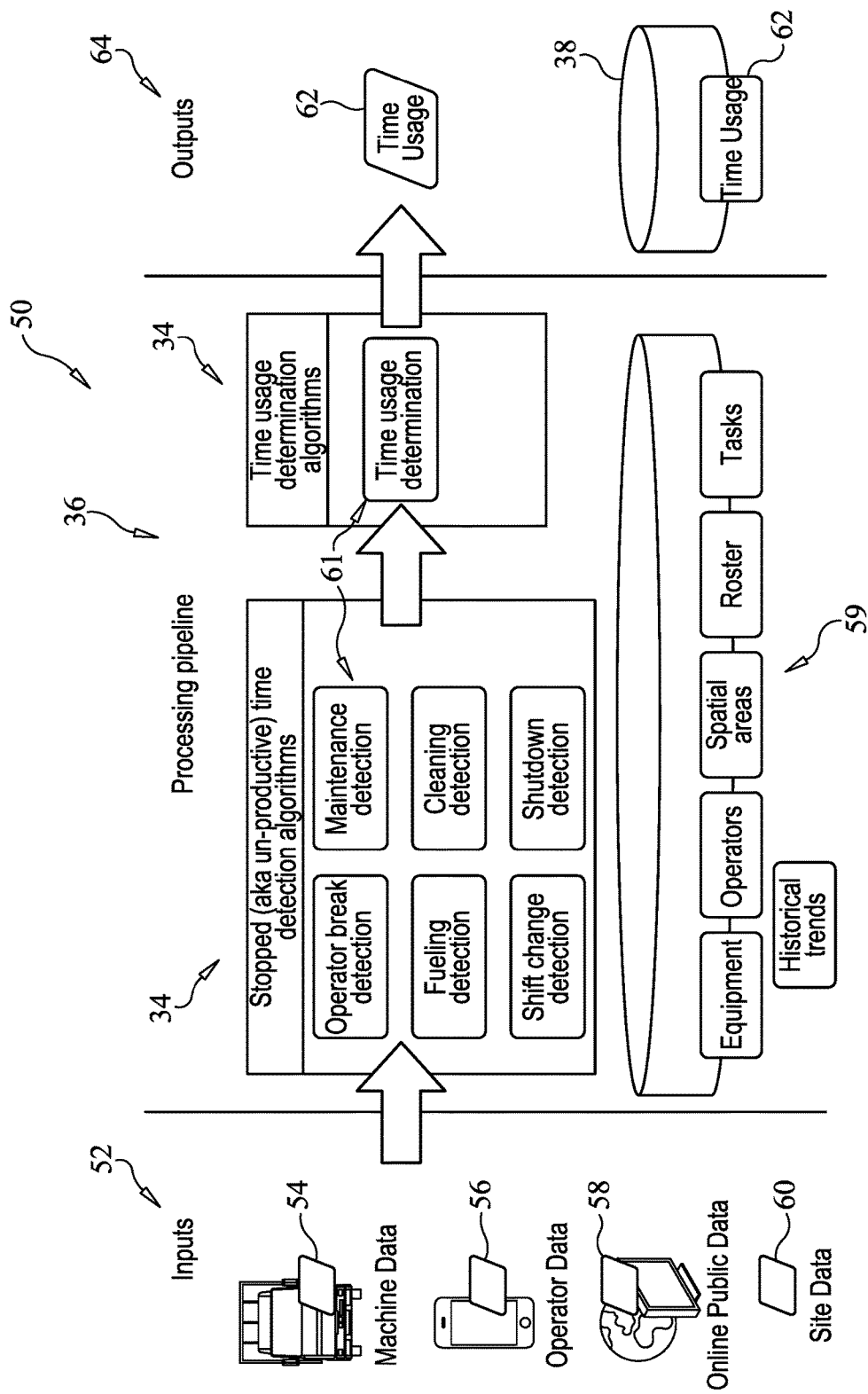
FIG. 2 is a schematic diagram of a machine time usage determination system, according to the present disclosure.

According to the exemplary embodiment, the central control station 30, or other control station, may include, access, or utilize a machine time usage determination system, illustrated in FIG. 2. The machine time usage determination system may include a controller 32 configured to execute a machine time usage determination program 34 for evaluating data received or gathered via a data processing pipeline 36 and automatically assigning current activities, or time usages, to equipment, such as machines 12, 14, 16. The data processing pipeline 36 is configured to receive data from multiple sources regarding a fleet of machines, which may include machines 12, 14, 16, at a common site, such as worksite 10. The time usages, based on the assigned current activities, may ultimately be stored in a database 38, or other electronic storage device.

Turning now to FIG. 2, an exemplary illustration of a machine time usage determination system is shown generally at 50. The machine time usage determination system 50 may receive data from inputs 52, which may include a variety of data sources 54, 56, 58, 60, via the data processing pipeline 36. In particular, and according to the exemplary embodiment, the inputs 52 may include machine data 54, operator data 56, online public data 58, and site data 60. Additional or alternative data may be used, including a variety of available or stored data 59, which may include current and historic data associated with various aspects of the mining operation, such as data regarding machines 12, 14, 16, operators, spatial areas, rosters, tasks, and historical trends, for example.

Machine data 54 may include, for example, machine sensor data, usage or maintenance/repair history, and/or machine pose (i.e., position, speed, heading). Exemplary operator data 56 may include information about the current machine operator (e.g., skill or experience level, amount of time logged during current shift, usage history, etc.), etc. Online public data 58 may include available weather data, public calendars, and the like. Site data 60 may include, among other data, a map of the worksite 10. It should be appreciated that a variety of data may be useful in characterizing machine activities and, thus, the types of data presented herein are provided for exemplary purposes only.

The data may be processed or analyzed using the machine time usage determination program 34, which may include a plurality of algorithms 61 and/or models, as will be described below, to determine or assign time usage 62 for equipment, such as machines 12, 14, 16. More specifically, the machine time usage determination program 34 may analyze sets of data, as described below, and assign current activities of a set of predetermined machine activities to the machines 12, 14, 16 corresponding to discrete moments in time. Ultimately, time usage 62 for the machines 12, 14, 16, which may be stored in the database 38, is automatically provided as an output 64.

Each of the predetermined machine activities, which may be site and/or machine specific, may be categorized as a productive activity or an unproductive activity. A productive activity may be one in which the machine 12, 14, 16 is performing productive work, while an unproductive activity may be one in which the machine 12, 14, 16 is not performing productive work. According to the exemplary embodiment, it may be desirable to further specify the type of unproductive activity being performed. For example, unproductive activities may include an operator break, fueling, shift change, maintenance, cleaning, and shutdown.

To classify the activity being performed by the machines 12, 14, 16, the machine time usage determination program 34 may include or use a number of algorithms 61, such as data mining algorithms, for creating or building one or more models for use in classifying data. For example, a classification algorithm may use an existing dataset and what is known about it to generate a predictive model for use in classifying future data.

For example, the machine time usage determination system 50 may detect that one of the machines 12, 14, 16 is currently non-productive while the operator takes his lunch break. The current speed and GPS location may suggest the machine 12, 14, 16 is stopped near a lunch hall designated on a worksite map. The time may also suggest that it is, in fact, the designated time for the operator to be taking a break.

A probabilistic model, for example, may provide a distribution of possible outcomes. That is, a probabilistic model may be used to determine a probability value associated with each assigned current activity. According to some embodiments, if the probability value is below a predetermined threshold, the controller 32 may be configured to request operator input and update the machine time usage determination program 34, or model, based on the operator input. Additionally, or alternatively, an operator, or other user, may be able to provide corrections to classifications, which may ultimately be used to update the machine time usage determination program 34.

According to an exemplary implementation, primary data inputs, such as time, GPS location, vehicle speed, a mine map, and a calendar of events, and secondary data inputs, such as cumulative data and data tracking trends, such as time since last refuel, average time between refuels, time since last break, and average time between breaks, with strong causal correlations may be used to train the machine time use determination system 50. An algorithm, such as, for example, a random forest algorithm or a support vector machine algorithm, may use the primary and/or secondary data inputs to create one or more models.

According to some embodiments, the controller 32 may be further configured to resolve conflicts between the set of predetermined machine activities. That is, which of the predetermined machine activities should be assigned if it is equally likely or probable that two of the predetermined machine activities are indicated. Further, according to some embodiments, the controller 32 may be further configured to modify the assigned current activity based on new data from the data processing pipeline 36 or a modification to the machine time usage determination program 34.

INDUSTRIAL APPLICABILITY

The present disclosure relates generally to machine time usage and, more particularly, to a system and method for evaluating data from multiple sources to automatically assign time usages to machines or equipment.

Figure 3:
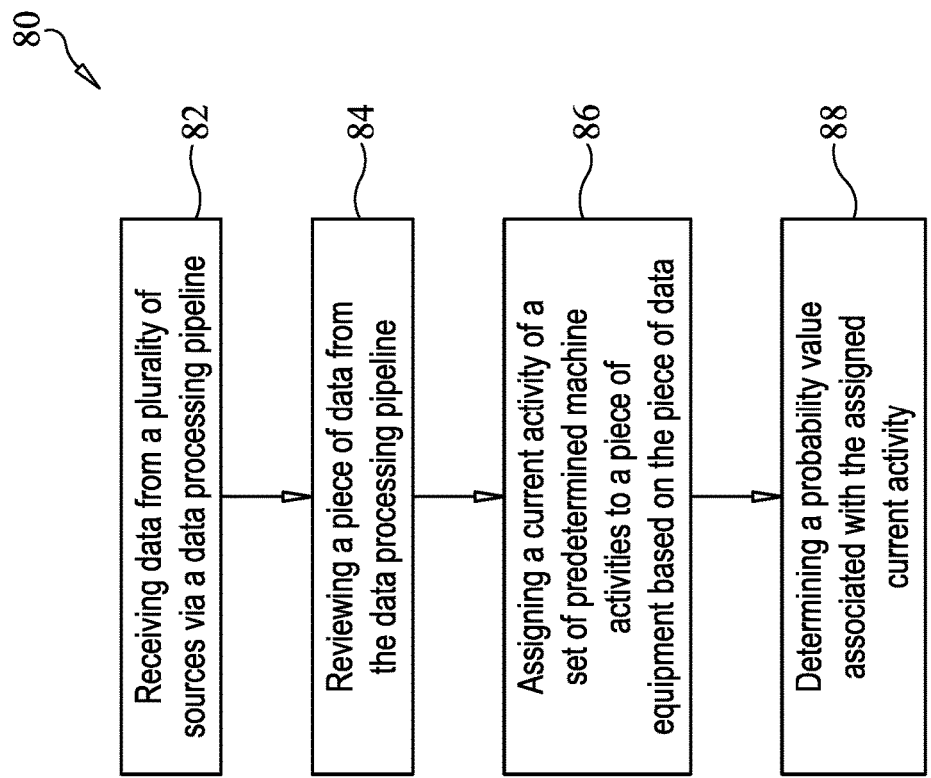
FIG. 3 is a flow diagram illustrating an exemplary method of determining machine time usage, according to the present disclosure.

Current fleet management systems can track and report on the amount of time machines spend in "productive" versus "unproductive" activities. However, these systems require operators to input how time is spent into a user interface. This data is critical to optimizing mining, or other construction operations, but the current method of manually entering the data is not ideal. It leads to operators, or other personnel, spending time on data entry that could be spent on more productive activities Referring generally to FIGS. 1-3, a method of determining machine time usage using a machine time usage determination system 50, which may be implemented at or for a worksite 10, includes execution of a machine time usage determination program 34. A controller 32, including a processor, may be in communication with a data processing pipeline 36 and programmed to execute the machine time usage determination program 34, which is illustrated as a flow diagram 80 in FIG. 3. The method may be implemented in whole or in part by the controller 32, with all or portions of the method running continuously or intermittently, such as at predetermined intervals.

At a first step, at box 82, the method includes receiving data from the data processing pipeline 36. Data inputs 52 may include machine data 54, operator data 56, online public data 58, and site data 60, for example. As shown at box 84, the method also includes a step of reviewing a set of data from the data processing pipeline 36. The machine time usage determination program 34 may include or use a number of algorithms 61 for creating or building one or more models for use in classifying data.

At box 86, the machine time usage determination program 34 assigns a current activity of a set of predetermined machine activities to a piece of equipment based on the set of data. That is, the machine time usage determination program 34 may include one or more algorithms using any of various classifiers to continuously and concurrently assess a probability that equipment, such as machines 12, 14, 16, is being utilized for particular usages.

At box 88, the machine time usage determination program 34 may also determine a probability value associated with the assigned current activity. If the probability value is below a predetermined threshold, the machine time usage determination system 50 may request operator input. The controller 32 may be further programmed to update the machine time usage determination program 34 based on the operator input. For example, if the probability value is less than, for example, 40%, then operator input can be requested to confirm the assigned current activity, from which the system 50 learns so that future determinations have greater probability. Further, the machine time usage determination system 50 may "learn" by accumulating trends as inputs to the algorithms or models.

For an operation performed at the worksite 10 to be profitable, the fleet of machines 12, 14, 16 must be productively and efficiently operated. The system and method of the present disclosure provides an efficient means for automatically determining machine time usages based on available data. A report of the time usage of the fleet of machines 12, 14, 16 may be generated and used to determine which unproductive activities have a relatively high impact on efficiency at the worksite 10 and should be addressed.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A machine time usage determination system, including:
    at least one machine at a worksite and having an onboard electronic system having one or more sensors configured to detect one or more properties related to the operation of the machine;
    a data processing pipeline configured to receive input data from a plurality of sources, at least one of the plurality of sources being the onboard electronic system of the at least one machine;
    a central control station including a controller in communication with the data processing pipeline and configured to execute a machine time usage determination program to:
        wirelessly receive the input data from the data processing pipeline, the input data at least including sensor data received from the one or more sensors of the onboard electronic system;
        review the input data received from the data processing pipeline;
        assign a current activity related to a use of the machine from a set of predetermined machine activities based on the input data, wherein the current activity is categorized as a productive activity or an unproductive activity; and
        determine a probability value associated with the assigned current activity.

2. The machine time usage determination system of claim 1, wherein the input data includes machine data and site data.

3. The machine time usage determination system of claim 2, wherein the input data further includes at least one of operator data and online public data.

4. The machine time usage determination system of claim 1, wherein the controller is further configured to store time usage for the machine.

5. The machine time usage determination system of claim 1, wherein the controller is further configured to resolve conflicts between the set of predetermined machine activities.

6. The machine time usage determination system of claim 1, wherein, if the probability value is below a predetermined threshold, the controller is further configured to request operator input.

7. The machine time usage determination system of claim 6, wherein the controller is further configured to update the machine time usage determination program based on the operator input.

8. The machine time usage determination system of claim 1, wherein the machine time usage determination program includes a plurality of algorithms.

9. The machine time usage determination system of claim 1, wherein the controller is further configured to modify the assigned current activity based on new data from the data processing pipeline or a modification to the machine time usage determination program.

10. The machine time usage determination system of claim 1, wherein the data processing pipeline is configured to receive data regarding a fleet of machines at a common worksite.

11. The machine time usage determination system of claim 10, wherein the common worksite is a worksite for a mining operation, and the fleet of machines includes at least one of digging machines, loading machines, and hauling machines.

12. A method of determining machine time usage for at least one machine of a plurality of machines at a worksite using a machine time usage determination program at a central control station, the method including steps of:

wirelessly receiving, at the central control station, input data from a plurality of sources via a data processing pipeline, the input data at least including sensor data received from one or more sensors associated with an onboard electronic system of the at least one machine, the one or more sensors being configured to detect properties related to the operation of the at least one machine;

reviewing the input data from the data processing pipeline;

assigning a current activity related to a use of the at least one machine from a set of predetermined machine activities based on the input data, wherein the current activity is categorized as a productive activity or an unproductive activity; and determining a probability value associated with the assigned current activity.

13. The method of determining time usage of claim 12, further including storing time usage for the at least one machine.

14. The method of determining time usage of claim 12, wherein wirelessly receiving input data includes receiving machine data and site data.

15. The method of determining time usage of claim 14, wherein wirelessly receiving input data further includes receiving operator data and online public data.

16. The method of determining time usage of claim 12, further including resolving conflicts between the set of predetermined machine activities.

17. The method of determining time usage of claim 16, further including updating the machine time usage determination program based on a conflict resolution.

18. The method of determining time usage of claim 12, further including requesting operator input if the probability value is below a predetermined threshold.

19. The method of determining time usage of claim 18, further including updating the machine time usage determination program based on the operator input.

20. The method of determining time usage of claim 12, further including modifying the assigned current activity based on new data from the data processing pipeline or a modification to the machine time usage determination program.

* * * * *